(12) United States Patent  (10) Patent No.: US 7,448,929 B2
Huber et al.  (45) Date of Patent: Nov. 11, 2008

(54) SHIP PROPULSION SYSTEM WITH COOLING SYSTEMS FOR THE STATOR AND ROTOR OF THE SYNCHRONOUS MACHINE OF THE PROPULSION SYSTEM

(75) Inventors: Norbert Huber, Erlangen (DE); Jürgen Rieger, Elangen (DE); Wolfgang Schmidt, Erlangen (DE); Bernd Wacker, Herzogenaurach (DE); Joachim Frauenhofer, Nürnberg (DE); Wolfgang Rzadki, Glinde (DE)

(73) Assignee: Siemens Aktiengesellschaft, München (DE)

( * ) Notice: Subject to any disclaimer, the term of this patent is extended or adjusted under 35 U.S.C. 154(b) by 79 days.

(21) Appl. No.: 10/557,555

(22) PCT Filed: May 12, 2004

(86) PCT No.: PCT/EP2004/005101

§ 371 (c)(1),
(2), (4) Date: Aug. 28, 2006

(87) PCT Pub. No.: WO2004/101356

PCT Pub. Date: Nov. 25, 2004

(65) Prior Publication Data

US 2007/0117478 A1  May 24, 2007

(30) Foreign Application Priority Data

May 16, 2003 (DE) ................................ 103 22 275

(51) Int. Cl.
*B63H 21/14* (2006.01)
*B63H 21/17* (2006.01)

(52) U.S. Cl. ..................................... 440/88 C; 440/6
(58) Field of Classification Search ...................... 440/6
See application file for complete search history.

(56) References Cited

U.S. PATENT DOCUMENTS

| 6,485,339 B1 * | 11/2002 | Hartig et al. .................... 440/6 |
| 6,768,244 B2 * | 7/2004 | Ong et al. .................... 310/254 |
| 6,994,602 B2 * | 2/2006 | Ries ............................... 440/6 |
| 7,029,339 B2 * | 4/2006 | Brach et al. .................... 440/6 |
| 2001/0035692 A1 | 11/2001 | Beulick |

FOREIGN PATENT DOCUMENTS

| CA | 2344731 A1 | 10/2001 |
| CN | 1057552 A | 1/1992 |
| CN | 1388632 A | 1/2003 |

(Continued)

*Primary Examiner*—Jesús D Sotelo
(74) *Attorney, Agent, or Firm*—Henry M. Feiereisen; Ursula B. Day (57) ABSTRACT

Disclosed is a ship propulsion system comprising a synchronous machine (6) with an especially superconducting rotor winding that is to be subjected to intense cooling and a normally conducting stator winding (11) which is to be cooled. The stator winding (11) is disposed at least in part inside a support structure (14) encompassing a hollow cylindrical magnetically soft outer body (13) and web-type support teeth (21*i*) that extend in an axial and radial direction. A hollow cylindrical part (15*a*) of an exterior housing (15) encloses the outer body (13). In order to cool at least some areas of said housing part (15*a*), the stator winding (11) is thermally coupled to water as a cooling medium (K) via the support structure (14) and the housing part (15*a*).

30 Claims, 4 Drawing Sheets

FOREIGN PATENT DOCUMENTS

| | | |
|---|---|---|
| EP | 1 010 814 A | 6/2000 |
| EP | 0 907 556 | 9/2001 |
| EP | 1 251 624 A | 10/2002 |
| WO | WO 99/38312 A | 7/1999 |
| WO | WO 03/019759 A | 3/2003 |
| WO | WO 03023941 A1 | 3/2003 |
| WO | WO 03/047962 | 6/2003 |
| WO | WO 03/101820 | 12/2003 |

* cited by examiner

SHIP PROPULSION SYSTEM WITH COOLING SYSTEMS FOR THE STATOR AND ROTOR OF THE SYNCHRONOUS MACHINE OF THE PROPULSION SYSTEM

BACKGROUND OF THE INVENTION

The invention relates to a ship propulsion system with a synchronous machine which includes
a) a rotor with a multi-pole rotor winding to be cooled to low temperatures, in particular to superconducting temperatures, wherein the rotor winding is thermally coupled directly or indirectly to a rotor cooling system, and
b) a stator surrounding the rotor with
   a cooled, normal-conducting stator winding,
   a support structure which at least partially supports the stator winding, the support structure having an essentially hollow-cylindrical outer body made of a soft-magnetic material and axially and radially extending fin-shaped support teeth disposed on the inside of the support structure, with at least sections of the stator winding being arranged between the support teeth,
   an outside housing with a hollow-cylindrical housing section surrounding the outer body, and
   a stator cooling system for dissipating heat generated by the stator winding to water as cooling medium.

A corresponding ship propulsion system with a synchronous machine is disclosed in WO 03/019759 A2.

The synchronous machine of the conventional ship propulsion system includes a rotor with a multi-pole rotor winding formed of conductors made of a high-$T_c$-superconducting material. The winding is housed in a vacuum-insulated cryostat adapted to receive a cryogenic cooling medium and must be maintained at an operating temperature between 15 K and 77 K. The stator winding of the machine is formed as a so-called air gap winding arranged to between non-magnetic support teeth. Cooling channels extending radially, axially, and/or in the circumferential direction are provided to effectively cool the winding sections, with water as cooling medium flowing through the channels. The radial dimensions of the support teeth are relatively large for accommodating the channels and for providing a sufficiently large cross-section for the cooling medium, so that the stator winding of the conventional machine can be sufficiently and effectively cooled.

However, the radial dimension is limited in some types of machines. In those types of machines having a relatively small outside diameter, heat generated in the stator winding is difficult to dissipate using such stator cooling system and a liquid cooling medium. These types of machines are required, in particular, for propeller and jet propulsion systems in floating units, such as ships.

Advantageous oceangoing capabilities of a marine surface ship are characterized by high speed and excellent maneuverability. A high continuous speed is required to provide good mobility over large distances. High top speeds and mobility are also required, although sometimes only for short durations. The continuous speed is around 20 knots, and the top speed should be in excess of 30 knots.

One important property is the operational endurance at sea, which depends on the supply of fuel, water and provisions as well as the operational reliability of the systems and the readiness of the crew. Today, high continuous speeds in rough seas in conjunction with excellent maneuverability have become a prerequisite for covering large distances. The ships must be ready for action worldwide.

For improved oceangoing properties, the systems and components of the propulsion and onboard networks must have a high functional availability. They must be structured so that damage to the components and their networking, for whatever reason, is identified by suitable sensors and damaged systems are disconnected from the propulsion and onboard network, so that the unaffected network can continue to operate with as little interruption as possible.

Several aspects for designing a propulsion system for a ship will now be discussed:

I. Propeller Propulsion System

Surface ships are typically driven by screw propellers. Diesel engines or gas turbines are arranged in the inside the ship, which transfer the mechanical energy to the propellers by way of shaft systems/gears. Based on recent operating experiences, marine propulsion systems have to meet particularly severe requirements, namely
   rapid startup capability,
   high maximum power with overload for short times,
   a small weight,
   excellent maintenance capabilities, as well as good installation and removal paths,
   low fuel consumption,
   high operational reliability.

The diesel engine has proven an ideal propulsion system for smaller marine vessels due to its relatively rapid startup capability, its construction and operating characteristic which saves space and personnel, and its low specific fuel consumption.

II. Water Jet Propulsion System

Such propulsion systems are used, in particular, in fast oceangoing ships and include a drive having at least one water jet, which is generated by a pumping system with an exit nozzle or nozzles. An impeller can be provided on one end of a pump shaft which is connected to a motor, such as an electric motor with, for example, high-$T_c$-superconductors, or to a diesel engine or a gas turbine (see, for example, also WO 03/101820 A1).

III. Fully Electric Ship (FES)

The electric onboard network of modern ships is composed of the following components and systems, namely
   electric energy generation,
   electric energy distribution, and
   electric energy consumers.

Since several years, the feasibility of fully electric marine surface ships has been investigated. The fully electric ship (FES) employs economical electric energy generators for propelling the ship with electric machines (propulsion network) and for supplying power to the onboard network.

Small experimental platforms are in operation since several years or are presently under construction. The electric propulsion and onboard networks mostly employ low voltages.

The following future technologies may be useful for generating electric energy:
   fuel cell technology
   gas turbine-generator-segments
   diesel engine-generator-segments.

The power requirements of systems generating electric energy for future ships are in the range of 20-50 MW depending on the demand from the onboard network and the speed of the vessel. Only an intermediate voltage system will be practical for distributing electric power at these power levels. DC distribution networks are also contemplated, because the fuel cell technology inherently produces a DC voltage.

The voltages used in onboard networks of future marine surface ships are in the low voltage and intermediate voltage range. The frequency of the onboard network is 60 Hz (sometimes 50 Hz).

Propulsion systems are contemplated, in particular in the context of the development of fully electric ships, which have at least one electric propulsion engine that is attached in the form of a pod to the underside of the ship's hull. Such propulsion systems are also referred to as "POD propulsion systems." Propulsion systems of this type, in particular with synchronous machines employing high-$T_c$-superconductors, are generally known (see, for example, WO 03/019759 A2, EP 0 907 556 B1, WO 03/047962 A2).

The most important objective in the design of these POD propulsion systems is a reduction of their weight.

Another objective is to achieve a hydrodynamic propeller efficiency of greater than 60%. The ratio POD diameter/propeller diameter is an important criterion for the POD propulsion system and should optimally be around 0.3 ... 0.33 (ratios lower than 0.3 produce only very small hydrodynamic advantages at the expense of an extraordinary high complexity for the POD).

The nacelle should have a relatively short length.

Conventional permanent magnet machines, conventional asynchronous and synchronous machines do not meet the requirements of aspect ratio and weight.

SUMMARY OF THE INVENTION.

It is therefore an object of the present invention to provide a ship propulsion system using a synchronous machine with the aforedescribed features, wherein the rotor and, more particularly, the stator winding can be reliably cooled using a less complex cooling system, and more particular, wherein the winding has a smaller radial dimension, as required for ship engines.

This object is solved according to the invention by a synchronous machine of a ship, propulsion system, in which at least partial regions of the housing section are cooled, and the stator winding is thermally coupled to the cooling medium (water) via the support structure and the housing section.

The support teeth must therefore be at least partially constructed of a material with a sufficiently high thermal conductivity.

The measures according to the invention are based on the concept that heat can advantageously be almost completely removed from the stator winding of the synchronous machine via the support teeth of the winding. Heat is therefore dissipated to the surrounding outer body by removing the heat from the stator winding, which typically has copper conductors, through the indispensable insulation and the thermally conducting support teeth. The surrounding outer body is made of a soft-magnetic material, in particular of iron, as required for magnetic flux conduction, and must have a relatively large cross-section to adequately guide the magnetic flux and to be able to absorb and dissipate enough heat. The heat is dissipated directly or indirectly to an exterior cooling medium at least through the surrounding housing section and optionally through additional parts of the outer housing. The cooling medium is preferably water, for example saltwater or freshwater.

Advantageously, heat is dissipated from the winding heads of the stator winding, which due to their highly complex three-dimensional geometry can generally not be inserted in the support structure, by thermal conduction via the copper conductors of the stator winding to the straight active section of the winding (in the region of the surrounding soft-magnetic outer body). From there, this portion of the heat as well as the heat from the straight active section are carried away by the thermally conducting support teeth to the soft-magnetic outer body and dissipated by the cooling medium via the housing section. The heat is transferred to the coolant essentially only via the support teeth and the outer body, which together form the support structure, and at least via the housing section of the outer housing.

Conversely, in conventional machines, the cross-section of the support teeth of the support structure, which have a comparatively low thermal conductivity, is inadequate to remove heat effectively.

Advantageously, additional equipment, such as forced cooling of the stator winding in the region of support teeth, can be omitted.

Because the stator winding of the synchronous machine is preferably a multi-pole winding with air gaps, which typically requires a rotor winding with a large induction, the rotor winding should be cooled to low temperatures by thermally coupling the rotor winding, either directly or indirectly, to a suitable rotor cooling system or its cooling medium. Preferably, the rotor winding can be constructed of superconductors, in particular superconductors made of a high-$T_c$ high-superconducting material.

Preferred embodiments of the ship propulsion system according to the invention with at least one synchronous machine are recited in the dependent claims.

For example, the active section of the stator winding of the stator can have an axial dimension which is at least twice, preferably at least four times, in particular at least six times, of its outside diameter. Stated differently, the stator winding has only a small radial dimension. These types of machines are employed preferably in ships (water jet or propeller/POD type). Unlike with the present invention, heat can only be effectively removed indirectly due to the small radial dimension of the stator winding of these machines.

All known cooling methods that use a liquid cooling medium or mixtures of liquid cooling media can be used for cooling the outer housing or the housing section of the synchronous machine. For example, cooling can be provided by a bath cooling. Alternatively, a forced flow of the cooling medium, which can be water or another cooling medium that is thermally coupled to the cooling medium water, can be produced at least on or in the housing section. The employed cooling medium can flow in discrete cooling channels, for example, through cooling coils arranged on the outside of the housing.

Advantageously, an additional cooling medium, which is disposed in its own cooling system, can be connected to the housing section which is thermally coupled to the cooling medium water. An additional cooling loop can be provided for the cooling medium water, whereby heat is exchanged between the cooling medium water and the additional cooling medium of the machine in a conventional manner. Corresponding cooling techniques can advantageously be employed, in particular, in ships.

Advantageously, the water cooling system can be thermally coupled to the cooling medium water of the stator cooling system. In particular, a first cooling loop of the stator cooling system,
a second cooling loop of the rotor cooling system, and
a third cooling loop with the cooling medium water, which is thermally directly or indirectly coupled to the first and a second cooling loop can be provided.

In this way, already available water, such as the freshwater or service water of the ship or the surrounding saltwater, can be used effectively.

Preferably, the support structure for the synchronous machine of the ship propulsion drive does not employ stator teeth made of iron, as in conventional machines, but the stator teeth are made instead of a material with a higher thermal conductivity λ. The thermal conductivity of iron is limited and is in a range between 40 to 60 W/(K*m), depending on a possible addition of other materials by alloying.

Since the support teeth are not made of ferromagnetic iron, the stator winding basically represents an air gap winding, whereby for this type of winding the dissipated heat is removed from the air gap winding via the support structure. It is hereby unimportant if one or several, for example electrically offset, stator systems are implemented as the air gap winding.

Advantageous embodiments of the synchronous machine of the invention are recited in the dependent claims not discussed above.

BRIEF DESCRIPTION OF THE DRAWING

For a discussion of the invention, reference is made to the drawings which illustrates preferred embodiments of synchronous machines according to the invention.

DETAILED DESCRIPTION OF PREFERRED EMBODIMENTS

Corresponding elements in the figures are labeled with the same reference symbols.

The ship propulsion system according to the invention with at least one synchronous machine is based on conventional propulsion systems, which can be, in particular, a propulsion system of a propeller/pod type or also of a water jet type. A propeller/pod type will be assumed for the following exemplary embodiment described below. Its synchronous machine includes a rotor with a low-temperature, in particular superconducting, multi-pole rotor winding which is thermally coupled, for example directly, to a rotor cooling system. The term direct coupling is to be understood as referring to a cooling system with a cooling medium in direct thermal contact with the parts of support of winding to be cooled. However, indirect cooling is also feasible, whereby heat is transferred between the parts of the rotor winding to be cooled and a rotor cooling system or a cooling medium through solid elements. A stator with a normally-conducting winding which is also cooled surrounds the rotor, whereby the stator winding is at least partially positioned in a support structure. The support structure includes a hollow-cylindrical outer body made of a soft-magnetic material, as well as fin-like support teeth disposed on the inside and extending in an axial and radial direction, with at least portions of the stator winding arranged between the support teeth. The soft-magnetic outer body is surrounded by an outer housing, which forms a hollow-cylindrical housing section in the region of the outer body. The heat generated in the stator winding is transferred to a cooling medium, in this case water, via a special stator cooling system. This stator cooling system will be described in more detail below.

The stator cooling system of the synchronous machine can be used, in particular, with those types of machines that have a stator winding with a large aspect ratio, i.e., wherein the active section of the stator winding of the stator has an axial dimension of several times the outside diameter. Such types of machines lack the space for accommodating discrete cooling channels in the region of the support teeth between their winding sections. A corresponding machine type is, in particular, the propeller/POD propulsion system of the exemplary embodiment depicted in FIGS. 1 to 3. Additional details of the propulsion system which are not part of the invention are not shown in the drawings and are disclosed, for example, in conventional embodiments disclosed in WO 03/019759 A2 or EP 0 907 556 B1.

Figure 1:
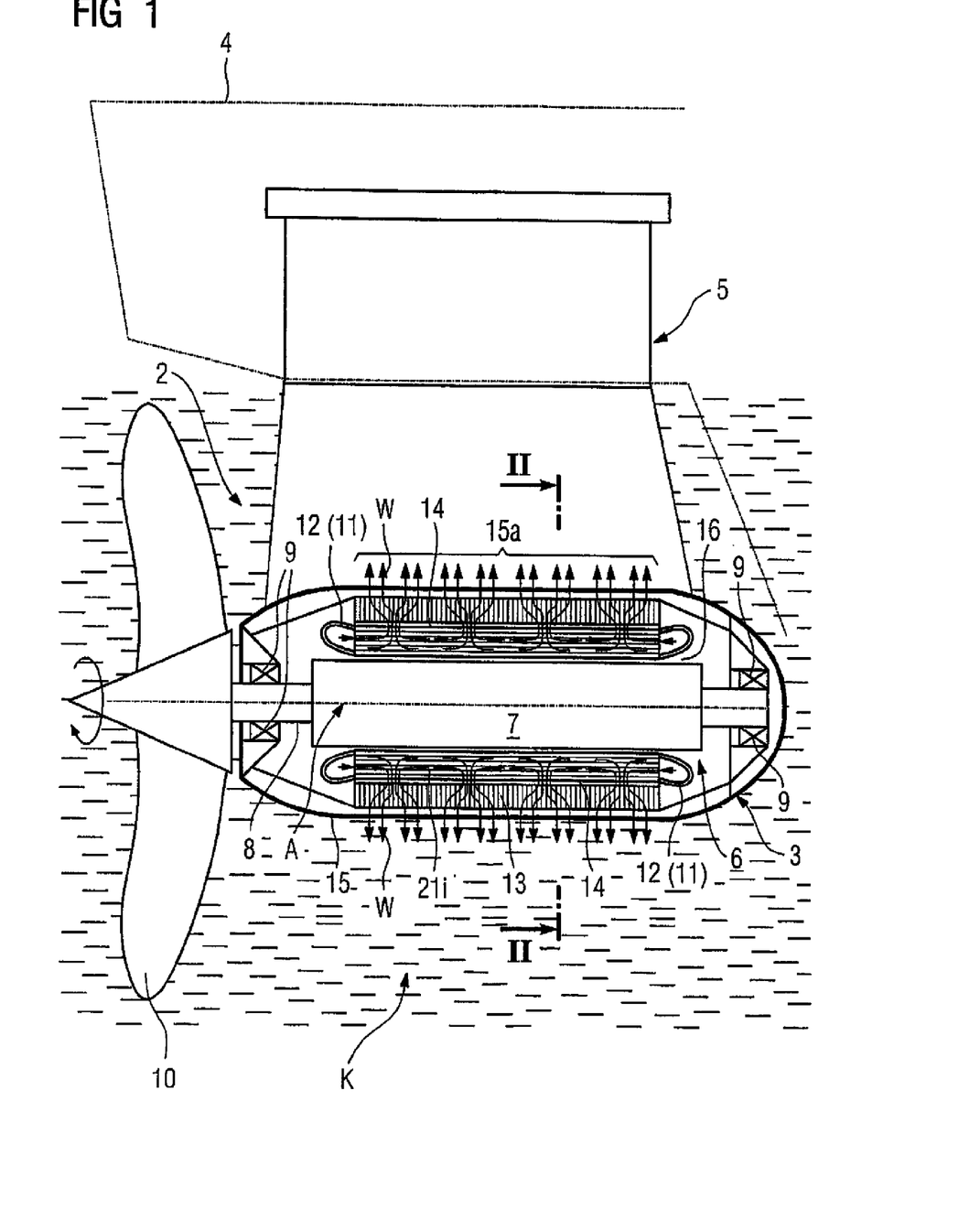
FIG. 1 shows schematically a longitudinal section through a POD propeller propulsion system of a ship having a machine of this type.

The Figure shows indicated by the reference symbol 2 a POD propulsion system unit for a ship, an engine pod 3, a ship's hull 4, a mounting device 5 for mounting the engine pod on the ship's hull, a synchronous machine 6, a rotor 7 of the machine, a rotor shaft 8 supported in shaft bearings 9, a ship propeller 10 mounted on the shaft, an air gap winding and three-phase winding 11 as a stator winding, winding heads 12 of this winding, a soft-magnetic iron yoke 13 forming an outer body of a support structure 14, an outer housing 15 of the machine with a housing section 15a surrounding the soft-magnetic outer body 13, an air gap 16 located between the air gap/stator winding 11 and the outside of the rotor 7, an axis A of the rotor 7 or the rotor shaft 8, heat flows W, and a cooling medium K such as water. The cooling medium K should preferably be at an initial temperature of between 275 K and 310 K, in particular between 275 K and 295 K. The stator winding 11 depicted in the Figure is mostly obstructed by support teeth 21i of the support structure 14, which extend axially, i.e., in the direction of the axis A; only the winding heads 12 at the end faces of the stator winding 11 are visible. The indicated heat flows W extend inside the winding 11 and in the support teeth 21i.

As indicated in the Figure by the arrowed lines of the heat flows W, the heat generated in the electric conductors of winding 11 are first transferred from the winding region to the soft-magnetic outer body 13 surrounding the axial section of the winding 11, and thereafter to the cooling medium K at least via the housing section 15a surrounding the outer body. The housing is, in particular in this region, advantageous made of a material having a high thermal conductivity, with the thermal conductivity A being greater than that of iron, in particular greater than 60 W/(K*m). The material is advantageously made of metal alloys, such as special bronzes, or for example by admixing or alloying of materials such as aluminum (Al) or magnesium (Mg). For example, a suitable Al-casting can have a thermal conductivity up to 210 W/(K*m), and a suitable Mg-casting can have a thermal conductivity of up to 150 W/(K*m). These materials enable a lightweight construction and can also be used to increase the surface area across which heat is exchanged with the cooling medium K.

Figure 2:
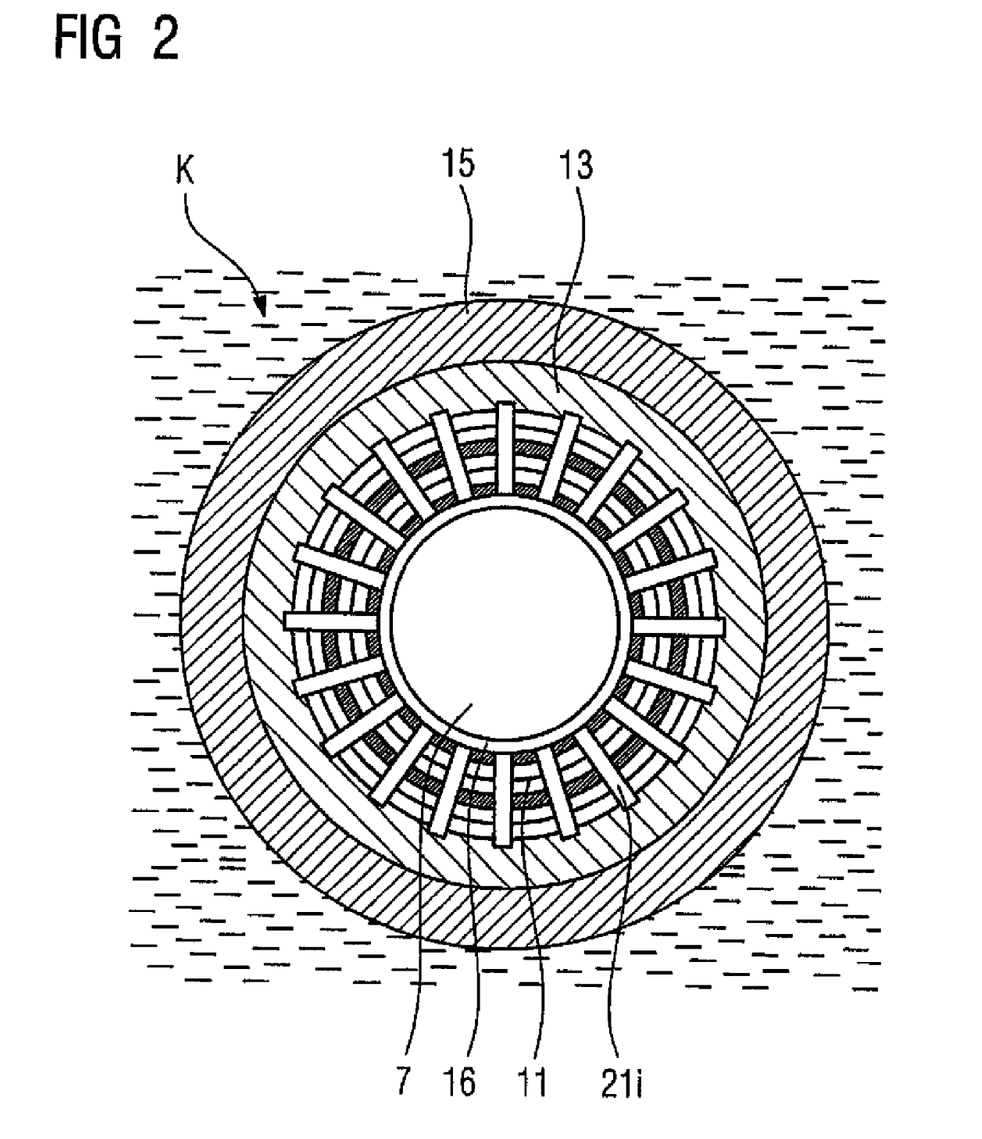
FIG. 2 shows schematically a cross-section through the machine of FIG. 1.

FIG. 2 shows a cross-section through the machine 6 of FIG. 1 with the surrounding outer housing 15 or the housing section 15a, respectively. The reference symbol 21i designates the individual support teeth between the various sections of the stator winding 11 which together with the soft-magnetic outer body 13 form the support structure 14 for the winding 11.

Figure 3:
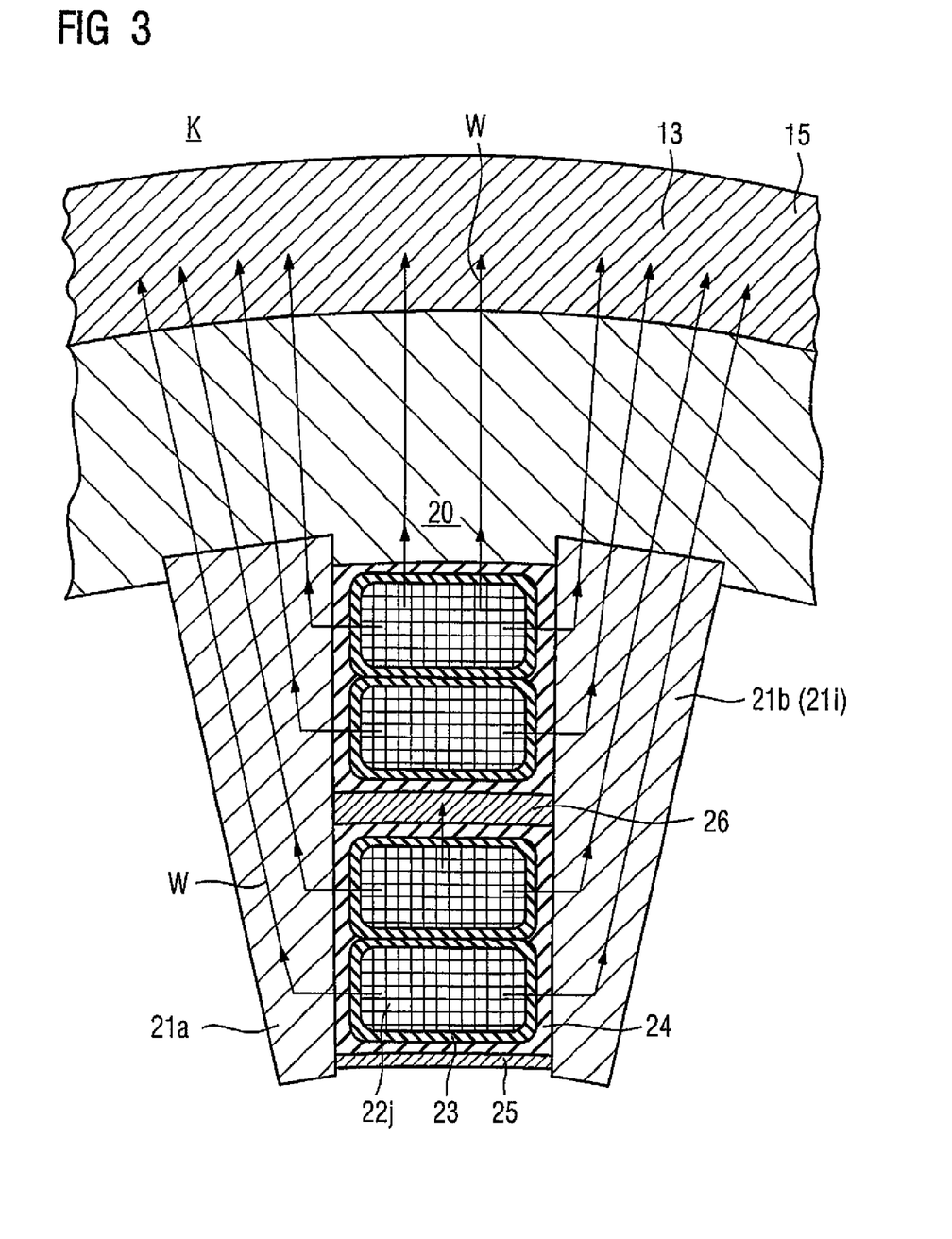
FIG. 3 shows schematically an enlarged detail of a stator slot from FIG. 2.

FIG. 3 shows an enlarged detail of FIG. 2 in the region of a stator slot 20. The Figure further shows two of the support teeth 21i, labeled with the reference symbols 21a and 21b, which form a lateral boundary of the stator slot in the circumferential direction, winding conductors or a winding stack 22j, for example Cu-conductors, of the stator winding 11, an insulation 23 around the individual conductors 22j, a primary insulation 24, a locking plate 25 disposed on the bottom of the slot 20 and an intermediate plate 26 disposed in the center region of the slot as described, for example, in DE 102 27 559 A1. It is unimportant how many conductors in the stator are connected in parallel or how many stator systems are employed in total. The most significant thermal resistance is the insulation of the winding conductors 22j and the primary insulation 24 between the conductor stack and the lateral support teeth 21a and 21b. The heat generated in the conductors 22j is transferred via these insulations to the support teeth 21a and 21b, which advantageously have a good thermal conductivity, and then dissipated to the cooling medium K via the soft-magnetic outer body 13 surrounding the outside of the slot and the housing section 15a of housing 15. Advantageously, the intermediate plate 26 can also be made of a material having a good thermal conductivity, but a poor electrical conductivity, for example of aluminum oxide, aluminum nitride or another ceramic material having good thermal conductivity.

The support teeth 21a, 21b (or 21i) of the synchronous machine for the propulsion system according to the invention perform three functions, namely
transferring the mechanical torques,
supporting and spacing the winding conductors 22j, and
dissipating/transferring heat.

The material for the support teeth can be, in particular, one of the aforementioned ceramic materials with a good thermal conductivity or metal alloys or a composite material, in particular incorporating carbon fibers with an excellent thermal conductivity, for example a CFR-composite (carbon fiber-reinforced plastic). Advantageously, the fibers can be oriented so as to provide an optimal heat flow. For example, the support teeth can have a wedge-shaped profile. The actual design and shape of an individual support tooth are unimportant, e.g., it does not matter if the tooth is made as a single piece of a uniform material or in sections from different materials, or from a sandwich material or a composite material. However, the required heat flow W should be dissipated adequately and reliably in the described manner.

In the embodiment of a POD-propulsion system for a ship described depicted in FIGS. 1 to 3, it was assumed that ocean water is employed as a cooling medium K that flows directly around the outer housing 15 and the housing section 15a. It will be understood that the machine can also employ different cooling loops with the cooling medium K. For example, the cooling medium cooling the housing section can be a cooling medium other than water, which is contained in a dedicated cooling system. The cooling system for the additional cooling medium can be coupled directly or indirectly to the cooling medium K, for example, the ship's freshwater supply or ocean water. Alternatively, in additional cooling loop can be provided for the additional cooling medium of the machine, wherein heat is exchanged between this additional cooling loop and cooling medium, i.e., water.

The cooling medium which cools the machine at least in the region of the housing section 15a can be placed in a vessel for a bath of the cooling medium or can also be forcibly moved along the outer housing. Such cooling medium can also flow through discrete coolant channels arranged at least in or on the housing section. For example, corresponding cooling coils in intimate contact with the housing section can be mounted on the outside of the housing section.

With this type of direct or indirect cooling, the operating temperature of the stator winding 11 can preferably be adjusted to between 275 K and 525 K, preferably between 275 K and 455 K, using water as the cooling medium, with an initial temperature typically between 275 K and 310 K, preferably between 275 K and 295 K.

Figure 4:
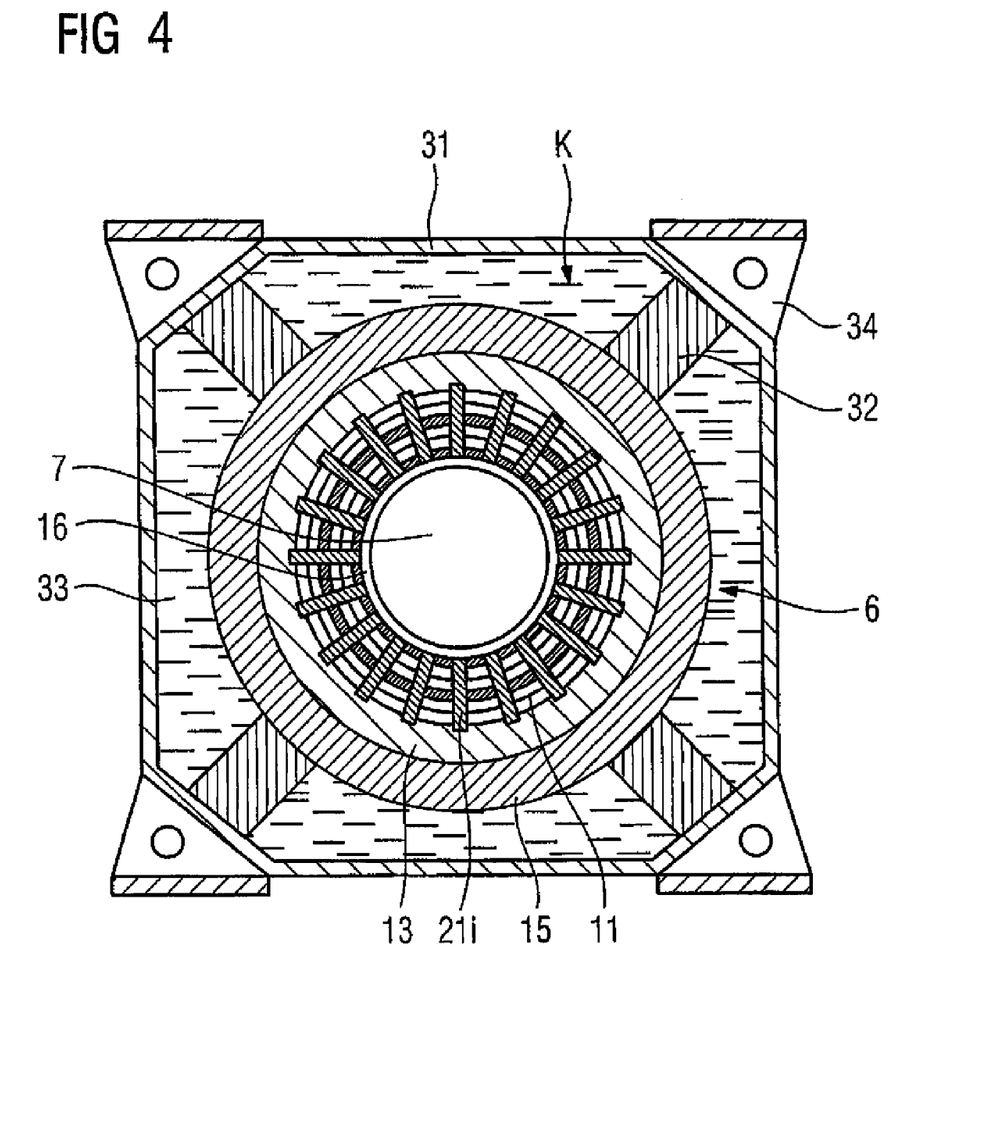
FIG. 4 shows schematically a cross-section through a water jet machine of a ship.

An indirect cooling technique is employed with the synchronous machine 6 depicted in FIG. 4. This figure shows an embodiment of the machine shown in FIGS. 1 to 3, wherein the machine is supported by support struts 32 inside a container housing 31. The cooling medium K is disposed in one or several intermediate spaces 33 between the container housing and the outer housing 15 of the machine 6. The depicted embodiment can be used, in particular, for water jet propulsion systems on ships where the actual engine is located in an engine compartment in the intermediate hull of the ship. Also shown are brackets 34 which engage on the outside of the container housing and can be use to install and attach the container housing 31 to a support. The support struts 32 transfer the torque from the machine and/or its outer housing to the container housing 31 and via the contacting brackets 34 to the support, which in the depicted example is the ship's intermediate hull.

The cooling medium K disposed between the container housing 31 and the machine housing 15 is preferably a fluid or a fluid mixture. The cooling medium is connected to a cooling loop, for example directly or indirectly to the freshwater system of a ship. Optionally, pumps can be employed. Feasible is also a separate recirculating water loop which is coupled to the ocean water to provide cooling. The separate heat exchange loop can operate by natural convection or forced convection. Natural convection requires suitably large cross-sections. Natural convection can, for example, be based on a thermosiphon effect, using a cooling medium, optionally water, suitable for these temperatures.

In the preceding embodiment, the type of machine employed for the synchronous machine was assumed to be a motor with a rotor having to a multipole rotor winding, in particular a winding made of a high-$T_c$-superconducting material (for example, according to WO 03/047962 A2). The rotor winding should be maintained by the rotor cooling system at an operating temperature of typically between 4 K and 120 K, preferably between 25 K and 77 K, in particular between 25 K and 35 K. A corresponding machine can be provided as a direct propulsion motor or as a generator for a ship propulsion system (see, for example, the aforementioned WO-A2 document). It will be understood that such machine can also be constructed using conductors made of a standard, metallic superconducting material or of normally-conducting, cooled conductors.

The aforedescribed cooling system for the stator winding 11 can advantageously be combined with a cooling system required for cooling the rotor winding. Because the operating temperature of the rotor winding is typically lower than the operating temperature of the stator winding, water used as the cooling medium for cooling the stator winding can in practice only be to pre-cool the rotor cooling system. Accordingly, a first cooling loop for the stator cooling system and a second cooling loop for the rotor cooling system are provided. The cooling medium water flowing through the third cooling loop is then thermally coupled, either directly or indirectly, to the first and the second cooling loops. Alternatively, the water cooling loop could also be integrated in the first cooling loop of the stator cooling system.

In the following, several aspects for designing a water jet propulsion system using an HTS-synchronous machine will be described.

The goal is here different from that of a POD motor:

The propulsion motor is to be installed in the ship's intermediate hull. Optimizing the diameter of the active section takes priority.

The length of the active section is hereby not as important.
A large weight is rather desirable.
The electric efficiency should be high.

The length of the shaft of the water jet propulsion system depends, on one hand, on its inclination angle with respect to the ship's hull and, on the other hand, on the installation height of the propulsion motor.

What is claimed is:

1. A ship propulsion system, comprising:
   a synchronous machine having a rotor with a multi-pole rotor winding;
   a rotor cooling system thermally coupled, to the rotor winding for cooling the rotor winding to a low temperature;
   a stator surrounding the rotor and including a stator winding;
   a stator cooling system for cooling the stator to a temperature where the stator winding is normally conducting, said stator cooling system removing heat generated by the stator winding to water as a cooling medium;
   a support structure which at least partially supports the stator winding, the support structure having a substantially hollow cylindrical outer body made of a soft-magnetic material and axially and radially extending fin-shaped support teeth disposed inside the hollow cylindrical outer body, with at least sections of the stator winding being arranged between the support teeth; and
   an outside housing with a hollow cylindrical housing section surrounding directly the outer body of the support structure,
   wherein at least partial regions of the housing section are cooled by direct thermal exchange with the cooling medium in or at the housing section, and the stator winding is thermally coupled to the cooling medium via the support structure and the housing section.

2. The ship propulsion system of claim 1, wherein an exterior section of the housing section is cooled.

3. The ship propulsion system of claim 1, wherein the cooled regions of the housing section are immersed in a cooling bath.

4. The ship propulsion system of claim 1, wherein the housing section is cooled by forcibly moving the cooling medium at least on or in the housing section.

5. The ship propulsion system of claim 4, wherein the housing section includes cooling channels and the cooling medium flows in the cooling channels.

6. The ship propulsion system of claim 1, further comprising an additional cooling system having an additional cooling medium, said additional cooling system being connected to the housing section.

7. The ship propulsion system of claim 6, wherein the additional cooling medium is water 8. The ship propulsion system of claim 1, wherein the cooling medium is water carried by the ship or water taken from the ocean.

9. The ship propulsion system of claim 8, wherein the cooling medium is water having an initial temperature between 275K and 310K.

10. The ship propulsion system of claim 8, wherein the cooling medium is water having an initial temperature between 275K and 295K.

11. The ship propulsion system of claim 1, wherein the stator cooling system cools the stator winding to an operating temperature between 275K and 525K.

12. The ship propulsion system of claim 1, wherein the stator cooling system cools the stator winding to an operating temperature between 275K and 455K.

13. The ship propulsion system of claim 1, wherein the rotor winding is made of a high-$T_c$-superconductor 14. The ship propulsion system of claim 13, wherein the rotor cooling system cools the rotor winding to an operating temperature between 4K and 120K.

15. The ship propulsion system of claim 13, wherein the rotor cooling system cools the rotor winding to an operating temperature between 25K and 77K.

16. The ship propulsion system of claim 13, wherein the rotor cooling system cools the rotor winding to an operating temperature between 25K and 35K.

17. The ship propulsion system of claim 1, characterized in that the rotor cooling system is thermally coupled to the cooling medium of the stator cooling system.

18. The ship propulsion system of claim 17, wherein the stator cooling system forms a first cooling loop, and the rotor cooling system forms a second cooling loop, and further comprising a third cooling loop with water as a cooling medium, said third cooling loop thermally directly or indirectly coupled to the first and second cooling loop.

19. The ship propulsion system of claim 1, wherein the stator winding has an active section with an axial dimension and an outside diameter, with the axial dimension being at least twice the outside diameter.

20. The ship propulsion system of claim 19, wherein the axial dimension is at least four times the outside diameter.

21. The ship propulsion system of claim 19, wherein the axial dimension is at least six times the outside diameter.

22. The ship propulsion system of claim 1, wherein the support teeth are at least partially made of a material with a greater thermal conductivity than that of iron.

23. The ship propulsion system of claim 1, wherein the housing section is at least partially made of a material with a greater thermal conductivity than that of iron.

24. The ship propulsion system of claim 1, wherein the support teeth are made of a material with a thermal conductivity greater than 60 W/(K*m).

25. The ship propulsion system of claim 24, wherein the material of the support teeth comprises a metal alloy, a ceramic material or a composite material.

26. The ship propulsion system of claim 1, wherein the rotor winding is cooled to a temperature where the rotor winding is superconducting.

27. The ship propulsion system of claim 1, wherein the cooling medium is water.

28. The ship propulsion system of claim 1, wherein the cooling medium is a cooling medium that is thermally coupled to water.

29. The ship propulsion system of claim 1, wherein the housing section is made of a material with a thermal conductivity greater than 60W/(K*m).

30. The ship propulsion system of claim 29, wherein the material of the housing section comprises a metal alloy, a ceramic material or a composite material.

* * * * *